(12) United States Patent
Jogand-Coulomb et al.

(10) Patent No.: US 8,533,741 B2
(45) Date of Patent: Sep. 10, 2013

(54) METHODS FOR LAUNCHING A PROGRAM APPLICATION

(75) Inventors: Fabrice Jogand-Coulomb, San Carlos, CA (US); David Guidry, Saratoga, CA (US); Pascal Caillon, New York, NY (US); Benjamin Vigier, San Francisco, CA (US)

(73) Assignee: SanDisk Technologies Inc., Plano, TX (US)

( * ) Notice: Subject to any disclaimer, the term of this patent is extended or adjusted under 35 U.S.C. 154(b) by 446 days.

(21) Appl. No.: 11/647,995

(22) Filed: Dec. 29, 2006

(65) Prior Publication Data

US 2008/0163246 A1 Jul. 3, 2008

(51) Int. Cl.
*G06F 9/44* (2006.01)

(52) U.S. Cl.
USPC .................................... 719/313; 713/1; 713/2

(58) Field of Classification Search
USPC .......................................... 713/1, 2; 719/313
See application file for complete search history.

(56) References Cited

U.S. PATENT DOCUMENTS

| | | | | |
|---|---|---|---|---|
| 5,696,975 A * | 12/1997 | Moore et al. | ................... | 717/168 |
| 5,838,910 A * | 11/1998 | Domenikos et al. | .......... | 709/203 |
| 5,838,916 A * | 11/1998 | Domenikos et al. | .......... | 709/219 |
| 5,911,121 A * | 6/1999 | Andrews | ........................ | 455/418 |
| 6,212,512 B1 * | 4/2001 | Barney et al. | ........................ | 1/1 |
| 6,529,992 B1 * | 3/2003 | Thomas et al. | .................... | 711/1 |
| 6,604,152 B1 * | 8/2003 | Bard et al. | ........................ | 710/16 |
| 6,771,250 B1 * | 8/2004 | Oh | ................................. | 345/156 |
| 6,971,067 B1 * | 11/2005 | Karson et al. | .................. | 715/777 |
| 6,986,030 B2 | 1/2006 | Shmueli et al. | | |
| 7,167,931 B2 * | 1/2007 | Bard et al. | ........................ | 710/16 |
| 7,370,268 B2 * | 5/2008 | Tann et al. | ....................... | 715/201 |
| 7,441,108 B2 | 10/2008 | Fisher et al. | | |
| 7,610,577 B1 * | 10/2009 | Roth | ............................... | 717/106 |
| 7,624,452 B2 * | 11/2009 | Young et al. | ..................... | 726/30 |
| 2001/0013064 A1 * | 8/2001 | Cox et al. | ....................... | 709/220 |
| 2002/0037738 A1 * | 3/2002 | Wycherley et al. | ............ | 455/550 |
| 2002/0077852 A1 * | 6/2002 | Ford et al. | ........................ | 705/2 |
| 2004/0083473 A1 * | 4/2004 | Thomas et al. | ................ | 717/174 |
| 2005/0096812 A1 * | 5/2005 | Nezu et al. | ........................ | 701/36 |
| 2005/0101309 A1 * | 5/2005 | Croome | ........................ | 455/418 |

(Continued)

FOREIGN PATENT DOCUMENTS

| | | |
|---|---|---|
| CA | 2243428 | 2/1999 |
| CN | 182050 | 8/2006 |

(Continued)

OTHER PUBLICATIONS

Office Action for U.S. Appl. No. 11/647,758, dated Oct. 7, 2009, 10 pages.

(Continued)

*Primary Examiner* — Kim Huynh
*Assistant Examiner* — Zahid Choudhury
(74) *Attorney, Agent, or Firm* — Brinks Hofer Gilson & Lione (57) ABSTRACT

A method for launching a program application is provided. Here, configuration instructions are stored in a memory device and the configuration instructions are associated with multiple configurations. A configuration is selected from the multiple configurations when the memory device is coupled to a computing device. Thereafter, a configuration instruction associated with the configuration is retrieved from the memory device. The program application is launched and the configuration instruction is transmitted to the program application.

15 Claims, 9 Drawing Sheets

(56) References Cited

U.S. PATENT DOCUMENTS

| | | | | |
|---|---|---|---|---|
| 2005/0114315 | A1* | 5/2005 | Tanner et al. | 707/3 |
| 2005/0165651 | A1* | 7/2005 | Mohan | 705/26 |
| 2005/0193389 | A1 | 9/2005 | Murphy et al. | |
| 2005/0285931 | A1* | 12/2005 | Maruyama et al. | 348/14.01 |
| 2006/0075224 | A1* | 4/2006 | Tao | 713/164 |
| 2006/0098941 | A1* | 5/2006 | Abe et al. | 386/52 |
| 2006/0240873 | A1 | 10/2006 | You et al. | |
| 2006/0294105 | A1* | 12/2006 | Rosenan et al. | 707/9 |

FOREIGN PATENT DOCUMENTS

| | | |
|---|---|---|
| EP | 0 896 491 | 2/1999 |
| JP | 2005-025122 | 1/2005 |
| JP | 2006-323466 | 11/2006 |
| JP | 2006-323510 | 11/2006 |

OTHER PUBLICATIONS

English Abstracts for Canadian Patent Application No. 2,243,428 and European Patent Application No. EP 0 896 491, 7 pages, Apr. 1999.

Mercurio, Chris, "How to Disable the Auto-Launch "feature" for SD Cards", <http://mytreao.net/archives/2006/08/hot-to-disable-the-autolaunch-feature-for-sd-cards.html> (visited on Dec. 15, 2006).

Knipper, Gary, "System ACE Configuration Solutions for Xilinx FPGAs", White Paper, May 18, 2006, 9 pages, WP151.

Search Report and Written Opinion for corresponding PCT application No. PCT/US2007/025712, 10 pages, Jun. 24, 2008.

Office Action for Chinese Patent Application Serial No. 200780048495.3, dated Aug. 21, 2012, 19 pages.

Notification of Reasons for Refusal for Japanese Patent Application Serial No. 2009-544024, dated Nov. 27, 2012, 7 pages.

Office Action for Chinese Patent Application Serial No. 200780048495.3, dated Jan. 22, 2013, 21 pages.

Notification of Reasons for Refusal for Japanese Patent Application Serial No. 2009-544024, dated Apr. 9, 2013, 5 pages.

Office Action for Chinese Patent Application Serial No. 200780048495.3, dated Mar. 1, 2012, 21 pages.

English Translation for Japanese Patent Application Serial No. 2005-025122, published on Jan. 27, 2005, 22 pages.

English Translation for Japanese Patent Application Serial No. 2006-323466, published on Nov. 30, 2006, 48 pages.

English Translation for Japanese Patent Application Serial No. 2006-323510, published on Nov. 30, 2006, 14 pages.

* cited by examiner

METHODS FOR LAUNCHING A PROGRAM APPLICATION

CROSS-REFERENCES TO RELATED APPLICATIONS

This application is related to U.S. patent application Ser. No. 11/647,758, filed on Dec. 29, 2006, and entitled "APPARATUSES FOR LAUNCHING A PROGRAM APPLICATION," the disclosure of which is incorporated herein by reference.

FIELD OF THE INVENTION

Embodiments of the present invention relate generally to memory technologies and, more particularly, to apparatuses and methods for launching a program application.

BACKGROUND

An operating system is a program application that essentially manages all the other program applications (e.g., file managers, device drivers, etc.) in a computing device. There are a variety of different operating systems that are available and, for a program application to run on a computing device, the program application must be compatible with the computing device's operating system. Compatibility is typically not an issue with most personal computers as only a few operating systems, such as Microsoft Windows, Linux, and Mac OS, are available for personal computers. As a result, most program applications intended for personal computers have versions that are adapted for the most popular operating systems. Personal computers therefore can run most program applications.

However, portable computing devices, such as mobile phones, typically have closed systems with custom or proprietary operating systems. For example, a program application that is configured to run on one mobile phone made by one manufacturer usually cannot run on a mobile phone made by another manufacturer because the operating systems are different. Most program applications that run on such computing devices are usually custom configured to run on one type of computing device and therefore, not portable to other computing devices. As a result, there is a further need for continuing efforts to improve the portability of program applications.

SUMMARY

Various embodiments of the present invention provide methods and apparatuses for launching a program application. It should be appreciated that the embodiments can be implemented in numerous ways, including as a method, a circuit, a system, or a device. Several embodiments of the present invention are described below.

In one embodiment, a method for launching a program application is provided. Here, configuration instructions are stored in a memory device and the configuration instructions are associated with multiple configurations. A configuration is selected from the multiple configurations when the memory device is coupled to a computing device. Thereafter, a configuration instruction associated with the configuration is retrieved from the memory device. The program application is launched and the configuration instruction is transmitted to the program application.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide apparatuses and methods for launching a program application. The connection of a memory device to a computing device triggers a selection of a configuration. The configuration instructions associated with the selected configuration are then retrieved from the memory device. Each configuration instruction is associated with a program application. The associated program application is launched and the corresponding configuration instruction is transmitted to the program application.

Figure 1:
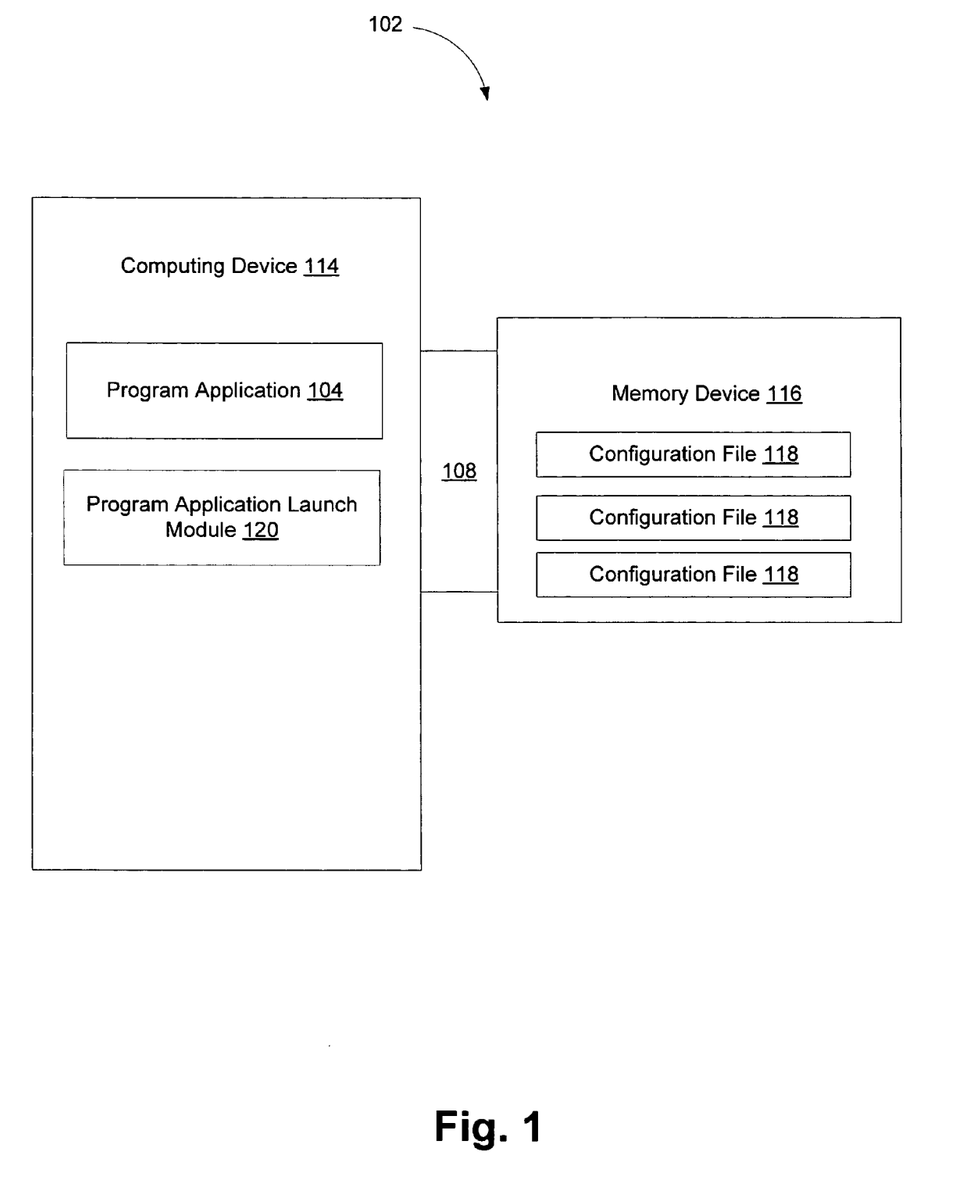
FIG. 1 is a simplified block diagram of a system of apparatuses associated with the launching of a program application, in accordance with an embodiment of the present invention.

FIG. 1 is a simplified block diagram of a system of apparatuses associated with the launching of a program application, in accordance with an embodiment of the present invention. As shown in FIG. 1, system 102 includes computing device 114 and memory device 116. In an embodiment, memory device 116 may be removably coupled to computing device 114 by way of mechanical interface 108, such as pin and/or socket connectors. In another embodiment, memory device 116 may interface with computing device 114 through a contactless interface. With contactless interface, for example, computing device 114 may communicate with memory device 116 through Radio Frequency Identification (RFID) induction technology. Memory device 116 is a memory storage device. As will be explained below, an example of memory device 116 is a memory card using non-volatile memory.

Computing device 114 can include a variety of electronic devices capable of accessing memory device 116. For example, access may include reading or retrieving configuration instructions stored in configuration files 118 from memory device 116. In the embodiment of FIG. 1, computing device 114 hosts program application 104. Program application 104 may be stored in computing device 114. Alternatively, program application 104 is stored in memory device 116 and computing device 114 retrieves or loads the program application from the memory device. Program application 104 may include a variety of program applications. For example, program application 104 may be a multimedia player configured to play audio and video files. Additionally, for example, program application 104 may be a Web browser. It should be noted that, in another embodiment, program application 104 may be hosted on memory device 116. Memory device 116 may include a processor (e.g., memory controller) that can also execute program application 104.

In addition, in an embodiment, computing device 114 may host program application launch module 120. As will be explained in more detail below, program application launch module 120 can be configured to retrieve configuration instructions from memory device 116 when the memory device is coupled to computing device 114, be configured to launch program application 104 on the computing device 114, and be configured to transmit the configuration instructions to the program application.

Figure 2:
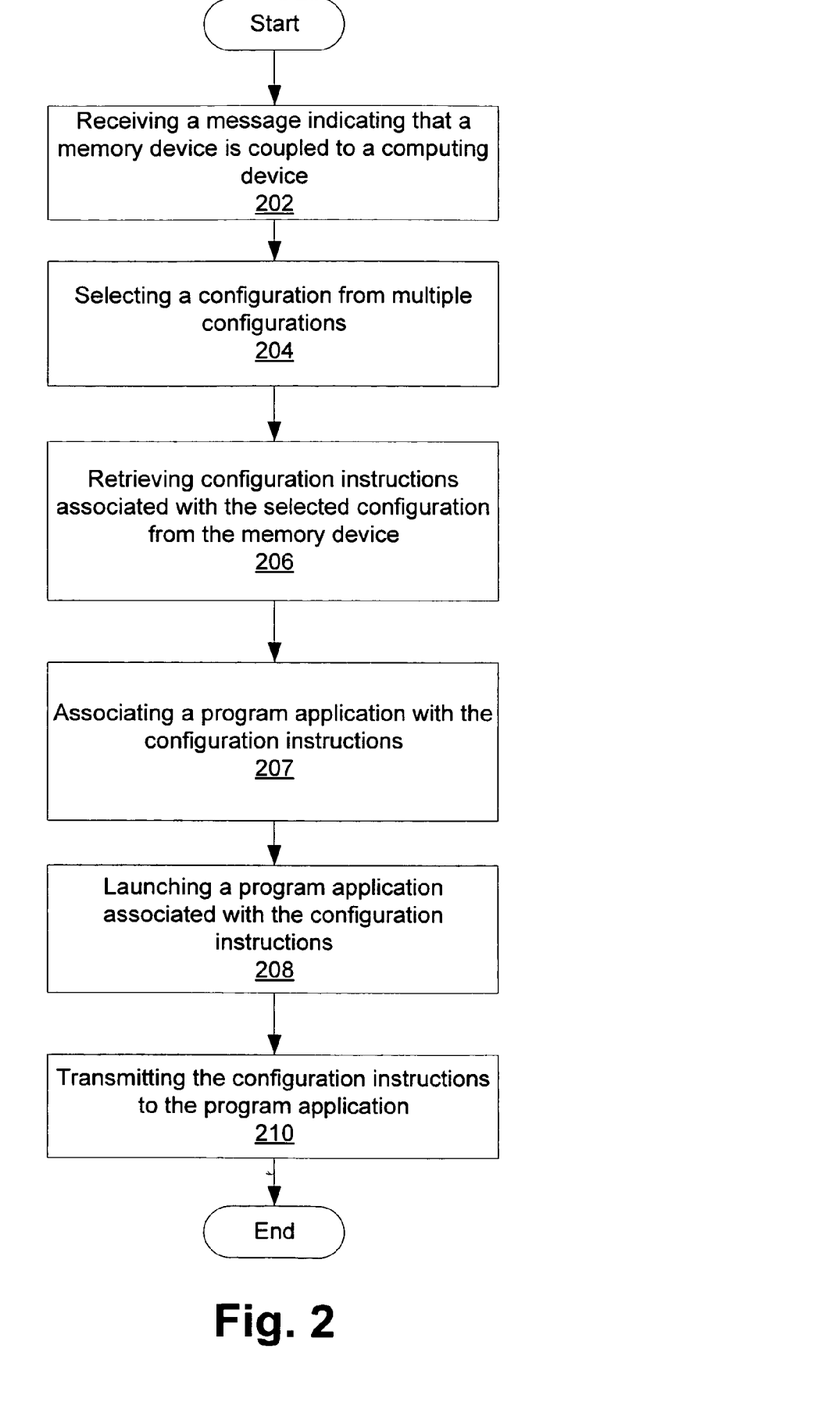
FIG. 2 is a flowchart diagram of a general overview for launching a program application, in accordance with an embodiment of the present invention.

FIG. 2 is a flowchart diagram of a general overview for launching a program application, in accordance with an embodiment of the invention. As shown in FIG. 2, a message is received at 202 indicating that a memory device is coupled to a computing device. The message is a communication that indicates whether the memory device is coupled to the computing device. For example, the message may be a one value (e.g., a flag) that indicates the memory device is coupled to the computing device or a zero value that indicates the memory device is not coupled to the computing device.

It should be noted that a memory device is configured to store one or more configuration instructions that are associated with one or more configurations. A configuration is associated with one or more program applications. In general, a configuration can define the way program applications are setup. For example, a configuration can define the size of fonts displayed in a Web browser. In another example, a configuration can include setting the home page of the Web browser to a particular Internet site by defining the Uniform Resource Locater (URL) associated with the Internet site. In still another example, a configuration can define the security settings of an operating system, such as disabling file sharing, enabling antivirus program applications, and other security configurations.

With the receipt of the message, a configuration is selected from multiple configurations at 204. There can be multiple configurations and one or more configurations can be selected automatically by the program application launch module or manually by a user. In an embodiment, the user may manually select a configuration. In another embodiment, the program application launch module can automatically select the configuration without user intervention. The program application launch module can automatically select the configuration based on, for example, information associated with or stored in a computing device or another memory card. Examples of information may include the type of operating system hosed on the computing device, a serial number of the computing device stored in the computing device, a network identifier from a subscriber identity module (SIM) card, a phone number from a SIM card, a user name stored in an operating system, a screen size of a display on the computing device, a type of memory device (e.g., SD Card™, MultiMediaCard™, or other card types), a serial number of the memory device, and other information. For example, computing devices can have displays with different screen resolutions, such as 640×480 pixels and 1280×1024 pixels. As a result, the program application launch module can select a particular configuration for a computing device with a 640×480 screen resolution, and can select another configuration for another computing device with a different 1280×1024 screen resolution. In another example, mobile phones (i.e., computing devices) may have different network providers. As a result, the program application launch module can select a particular configuration for a mobile phone with one network provider or select another configuration for another mobile phone with another network provider. The configuration of a program application can therefore be customized based on a variety of information.

Still referring to FIG. 2, with the configuration selected, one or more configuration instructions associated with the selected configuration are retrieved from the memory device at 206. Configuration instructions associated with a configuration define the configuration. In other words, configuration instructions are computer codes that describe a configuration. Configuration instructions can, for example, include commands that instruct the program application to perform a particular operation. An example of a command can include the command "browse," which can instruct a Web browser to access a particular Internet site. Another example can include the command "copy," which can instruct an operating system to copy a particular file. A third example can include the command "playback," which can instruct a music player to play a particular music file. Configuration instructions can also include parameters. An example of a parameter can include data that are associated with the command. An example of a parameter can include an URL that is associated with the command "browse." The URL is a string of characters used to identify a resource on a network. Another example of a parameter is a filename that is used to uniquely identify a file stored on, for example, a computing device or a memory device. A parameter may also include, for example, the desktop settings of a computing device, such as background color, type of font used in the desktop, and other desktop settings. With both commands and parameters, configuration instructions can enable or instruct the program application to perform a variety of operations. For example, a configuration instruction can enable the program application to display text and/or graphics, such as a welcome or a thank you text message displayed with a graphic logo of a network provider. In another example, as will be explained in more detail below, a configuration instruction can enable the program application (e.g., a Web browser) to automatically connect to an Internet site.

Configuration instructions are stored in the memory device. The configuration instructions may be stored in a variety of data structures, such as arrays, files, tables, databases, and other data structures. In an embodiment, as explained in more detail below, the configuration instructions are stored in one or more configuration files. After the configuration instructions are retrieved, the configuration instructions are associated with one or more program applications at 207. For example, the program application launch module can associate (or identify) the configuration instruction "browse" with a Web browser. In another example, the configuration instruction "playback" can be associated with a music player. In still another example, the configuration instruction "view" can be associated with a video player. At 208, the program application associated with the retrieved configuration instructions is launched at the computing device after the memory device is coupled to the computing device. In other words, the program application associated with the retrieved configuration instructions is executed or started on the computing device. The configuration instructions are then transmitted to the program application at 210.

Figure 3:
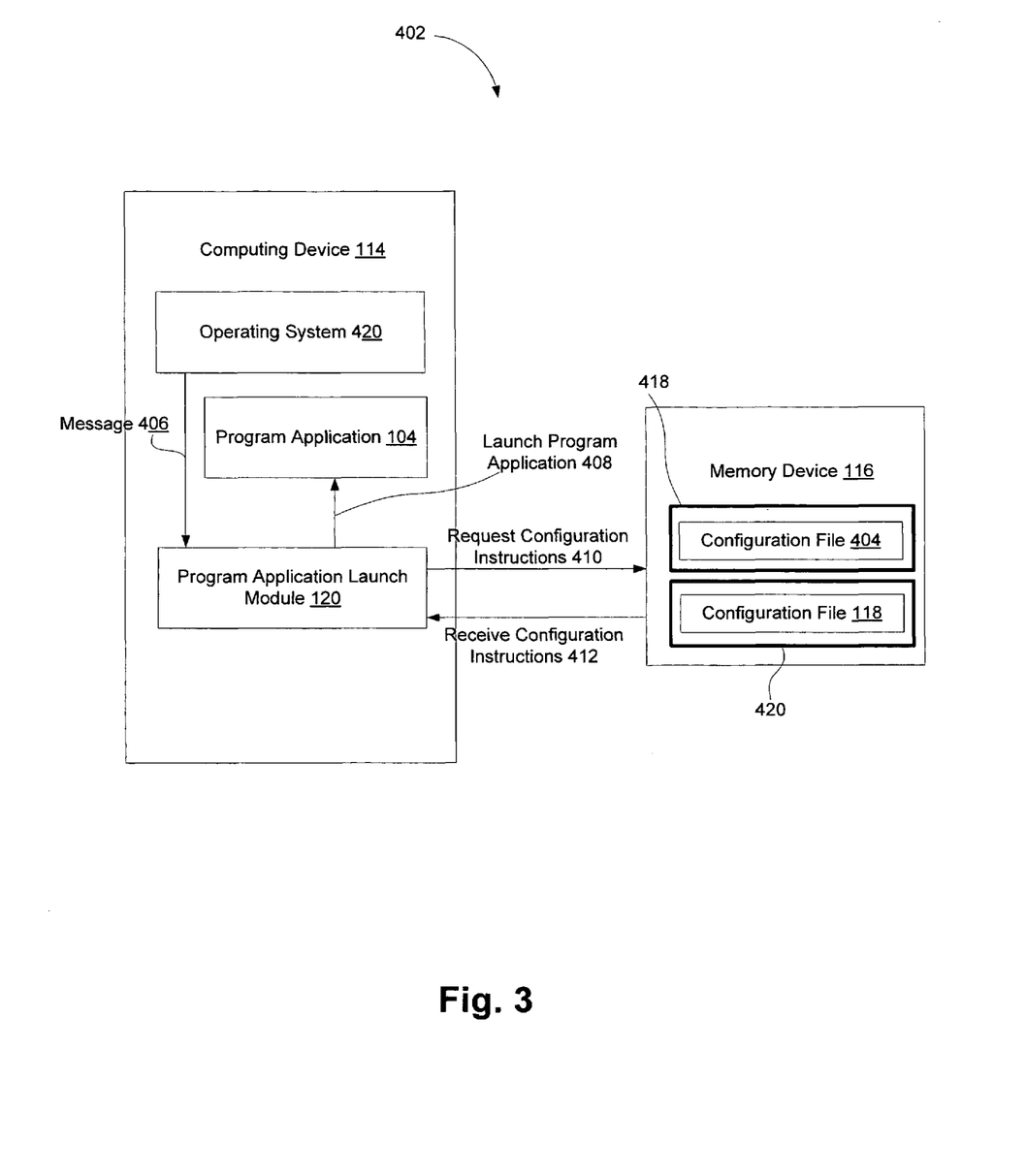
FIG. 3 is a simplified block diagram of a system for launching a program application, in accordance with an embodiment of the present invention.

FIG. 3 is a simplified block diagram of a system for launching a program application, in accordance with an embodiment of the present invention. System 402 includes computing device 114 and memory device 116. Computing device 114 hosts operating system 420, program application 104, and program application launch module 120. Memory device 116 is configured to store configuration instructions in configuration files 404 and 118. It should be noted that configuration files, such as configuration files 404 and 118, may be stored in hidden partition 418 of memory device 116 where the configuration files are not visible or accessible by many program applications, such as program application 104 and operating system 420. In the example of FIG. 3, configuration file 404 is stored in hidden partition 418 while configuration file 118 is stored in partition 420 that is visible to most program applications.

When memory device 116 is coupled to computing device 114, operating system 420 may receive an interrupt from the computing device that indicates memory device 116 is coupled to the computing device. As a result, operating system 420 transmits message 406 to program application launch module 120 indicating that memory device 116 is coupled to computing device 114. Program application launch module 120 receives message 406 from operating system 420 and selects a configuration. In an embodiment, program application launch module 120 may select the configuration from multiple configurations based on information stored in computing device 114. Information may be stored in computing device 114 and/or memory device 116. Program application launch module 120 can retrieve information from computing device 114 and/or memory device 116. Alternatively, the information may be provided to program application launch module 120. As discussed above, information may, for example, be a serial number associated with computing device 114. If the selection is based on the serial number, program application launch module 120 may be configured to select different configurations with different serial numbers. In another embodiment, program application launch module 120 may select the configuration based on information from memory device 116. For example, the selection can be based on the availability of configuration files, such as configuration files 404 and 118, stored in memory device 116. Here, configuration file 118 may not be accessible because the configuration file is erased or protected to prevent modifications to the configuration file. If one configuration file, such as configuration file 118, is not accessible or available, then program application launch module 120 can select a configuration that is associated with the other configuration file, such as configuration file 404. For instance, it should be appreciated that memory device 116 may be formatted into different sectors such that the memory device can store data. Data stored in partition 420 of memory device 116 are erased in a format operation. However, data stored in hidden partition 418 are preserved in a format operation. If memory device 116 is formatted, then configuration file 118 stored in partition 420 is erased while configuration file 404 stored in hidden partition 418 is not erased. Program application launch module 120 can initially attempt to read configuration file 118 from memory device 116. If memory device 116 is formatted, then configuration file 118 is erased and program application launch module 120 selects a configuration that is associated with configuration file 404. On the other hand, if memory device 116 is not formatted, then program application launch module 120 selects a configuration that is associated with configuration file 118. Alternatively, configuration file 118 may be protected. If configuration file 118 is protected and the configuration file is to be modified, then program application launch module 120 selects a configuration that is associated with configuration file 404 instead.

Configuration instructions are stored in memory device 116 and, with the configuration selected, program application launch module 120 retrieves one or more configuration instructions that are associated with the selected configuration from memory device 116. In other words, program application launch module 120 selects and retrieves the configurations instructions that are associated with the selected configuration from memory device 116. As discussed above, configuration instructions can include commands and parameters. An example of a configuration instruction is "connect: http://www.sandisk.com/," where the "connect" is a command and "http://www.sandisk.com/" is a parameter associated with the command. Here, the command "connect" may be a command associated with a Web browser and the parameter "http://www.sandisk.com/" is an URL. Another example of a configuration instruction is "playback:<d>:\music.mp3," where the command "playback" is associated with a music player and the parameter "<d>:\music.mp3" is a directory path of an audio file. As shown in FIG. 3, program application launch module 120 can retrieve the configuration instructions from memory device 116 by making a request 410 to the memory device for the configuration instructions that are associated with the selected configuration. In response, program application launch module 120 receives 412 the configuration instructions from memory device 116.

The configuration instructions may be stored in a variety of data structures, such as arrays, files, tables, databases, and other data structures. In FIG. 3, for example, the configuration instructions are stored in configuration files 404 and 118. The configuration instructions associated with one configuration can be stored in one configuration file, such as configuration file 404 or 118. Each configuration file 404 or 118 can therefore be associated with one configuration. With multiple configurations, the configuration instructions are stored in multiple configuration files 404 and 118. Here, each configuration file 404 or 118 is associated with a different configuration. In other words, memory device 116 may include multiple configuration files that correspond to multiple configurations. As a result, to retrieve the configuration instructions associated with a selected configuration, program application launch module 120 searches for the configuration file that is associated with the selected configuration and retrieves the configuration instructions from the configuration file.

Still referring to FIG. 3, after the configuration instructions are retrieved, program application launch module 120 associates one or more program applications, such as program application 104, with each configuration instruction. Computing device 114 may host a variety of different program applications, such as Web browsers, music players, photo editing applications, and other program applications. Each configuration instruction may be associated with or correspond to a different program application. Program application launch module 120 can be configured to recognize and associate each of the configuration instructions with a corresponding program application, such as program application 104. In the example shown in FIG. 3, program application 104 may be a Web browser, and if program application launch module 120 retrieves a configuration instruction that is identified with the Web browser, such as "browse" command, then the program application launch module 120 associates the configuration instruction "browse" with the Web browser (e.g., program application 104). Thereafter, program application launch module 120 launches program application 104 that is associated with the retrieved configuration instructions. It should be noted that program application 104 is launched or executed at computing device 114. Program application launch module 120 may be configured to directly launch program application 104 or launch the program application by calling another program application, such as operating system 420 or an automatic launch module (not shown), to launch the program application. After program application 104 is launched, program application launch module 120 then transmits the configuration instructions to program application 104.

Figure 4:
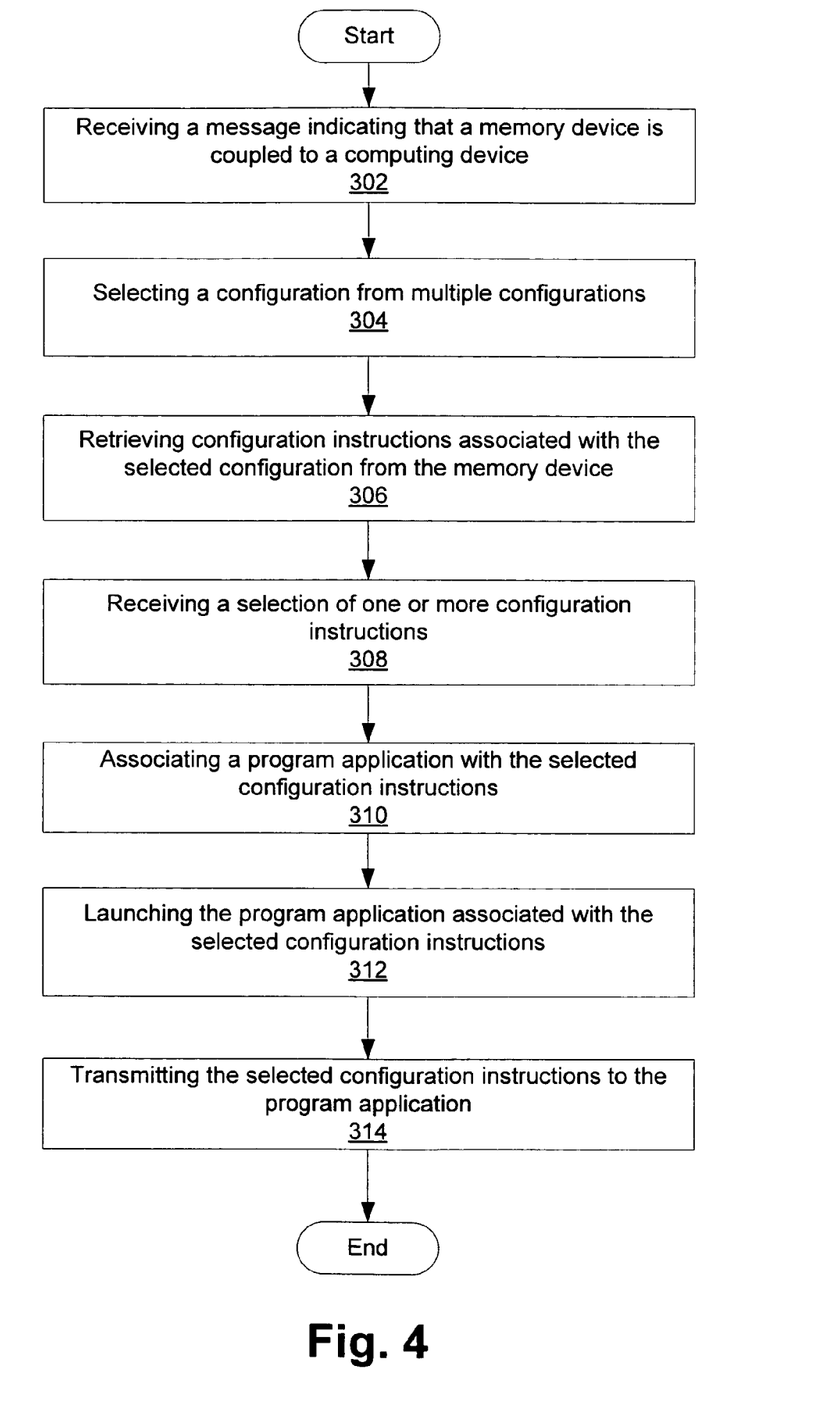
FIG. 4 is a flowchart diagram of a general overview for launching a program application, in accordance with another embodiment of the present invention.

FIG. 4 is a flowchart diagram of a general overview for launching a program application, in accordance with another embodiment of the invention. As shown in FIG. 4, a message is received at 302 indicating that a memory device is coupled to a computing device. The memory device is configured to store one or more configuration instructions that are associated with one or more configurations. With the receipt of the message, a configuration is selected from multiple configurations at 304. The configuration can be selected based on, for example, information associated with or stored in a computing device or another memory device.

The configuration instructions associated with the selected configuration are stored in the memory device. With the configuration selected, the configuration instructions associated with the selected configuration are retrieved from the memory device at 306. After the configuration instructions are retrieved, a selection of one or more configuration instructions is received at 308. In an embodiment, as will be explained in more detail below, the configuration instructions associated with the selected configuration can be displayed in a graphical user interface (GUI) on a computing device. The GUI is configured to display or provide the configuration instructions for selection. A user can manually select one or more configuration instructions associated with the selected configuration for transmittal to a program application.

With the receipt of a selection of configuration instructions, one or more program applications are associated with each of the selected configuration instructions at 310. Thereafter, the program applications associated with the selected configuration instructions are launched at 312. The configuration instructions are then transmitted to the program applications at 314.

Figure 5:
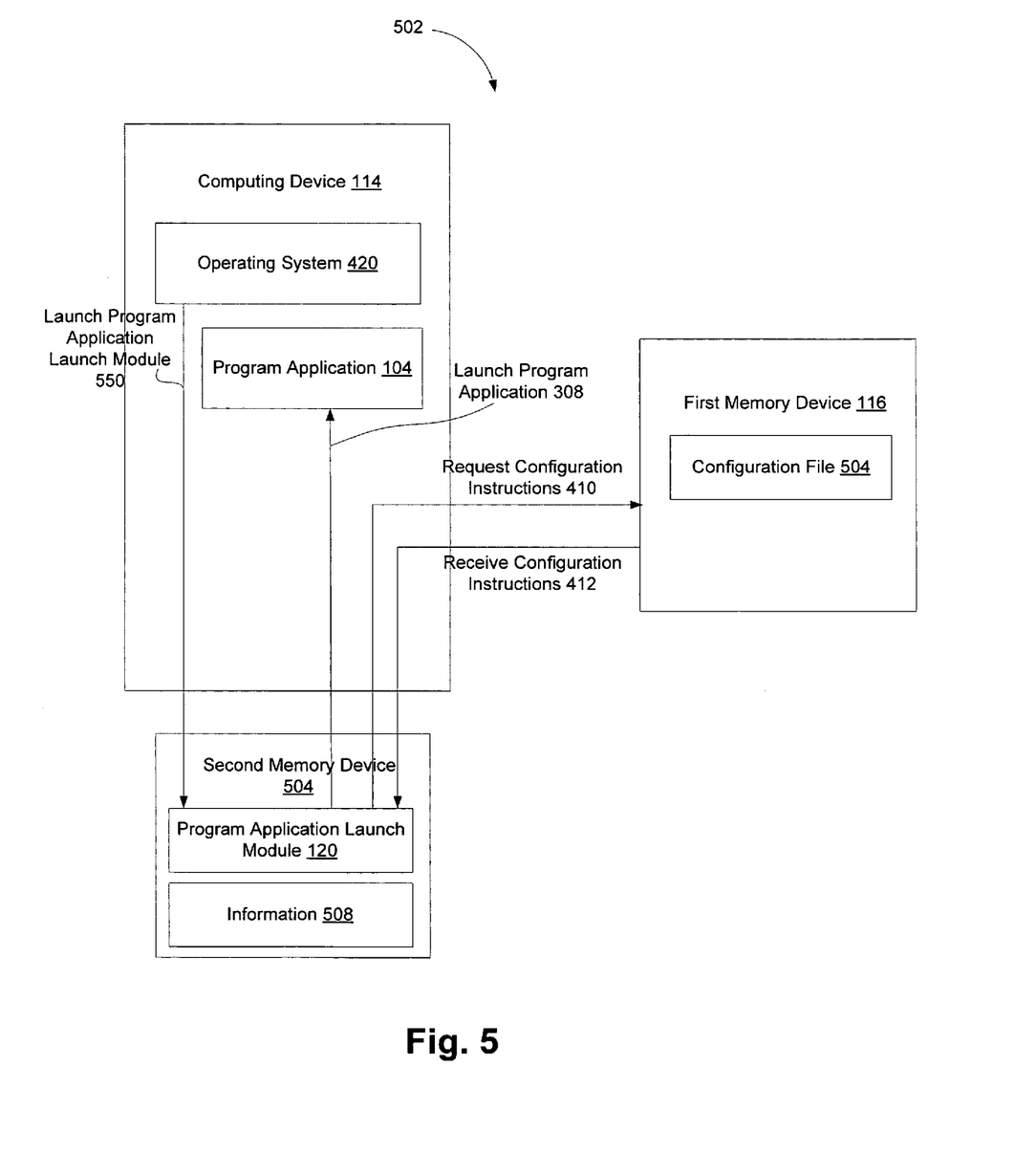
FIG. 5 is a simplified block diagram of a system for launching a program application, in accordance with another embodiment of the present invention.

FIG. 5 is a simplified block diagram of a system for launching a program application, in accordance with another embodiment of the present invention. System 502 includes computing device 114, first memory device 116, and second memory device 504. Computing device 114 hosts operating system 420 and program application 104. First memory device 116 and second memory device 504 are removably coupled to computing device 114. First memory device 116 and second memory device 504 are memory storage devices. As will be explained below, an example of first memory device 116 is a memory card using non-volatile memory. In another example, second memory device 504 is a smart card, such as a Subscriber Identity Module (SIM) card. First memory device 116 is configured to store configuration instructions in configuration file 504. In the embodiment of FIG. 5, second memory device 504 is configured to host program application launch module 120, which may be in the form of an applet. Additionally, as explained below, second memory device 504 can also store information 508.

In FIG. 5, second memory device 504 is already coupled to computing device 114. Second memory device 504 may, for example, be a SIM card that is included with computing device 114 in the form of a mobile phone. When first memory device 116 is coupled to computing device 114, operating system 420 may receive an interrupt from the computing device that indicates the first memory device is coupled to the computing device. As a result, operating system 420 launches 550 program application launch module 120. When launched, program application launch module 120 selects a configuration. In an embodiment, program application launch module 120 may retrieve information 508 from second memory device 504 and select the configuration from multiple configurations based on the information. As discussed above, information 508 stored in second memory device 504 may include a variety of data. If second memory device 504 is a SIM card, then information 508 may, for example, be associated with a mobile phone, such as an identifier. The identifier may be configured to identify, for example, a network associated with the mobile phone (i.e., a network identifier), a user, a phone number, or a country (i.e., country identifier). The network identifier and the country identifier may be included in an International Mobile Subscriber Identity (IMSI). The IMSI is a unique number that is associated with a networked mobile phone and can be stored in a SIM card. An IMSI can be fifteen digits long where a portion of the digits (e.g., first three digits) can be the country identifier (e.g., Mobile Country Code (MCC)) and the other portion of the digits (e.g., the next twelve digits) can be the network identifier (e.g., Mobile Network Code (MNC)). The phone number of the mobile phone can be included in a Mobile Station Integrated Services Digital Network (MSISDN), which can also be located in a SIM card. The MSISDN may be a fifteen digit number that identifies the phone number of the mobile phone. As a result, if the selection is based on, for example, a network identifier, then program application launch module 120 may be configured to select different configurations with different network identifiers.

Configuration instructions are stored in first memory device 116 and, with the configuration selected, program application launch module 120 selects and retrieves the configurations instructions that are associated with the selected configuration from first memory device 116. As shown in FIG. 5, program application launch module 120 can retrieve the configuration instructions from first memory device 116 by making a request 410 to the first memory device for the configuration instructions that are associated with the selected configuration. In response, program application launch module 120 receives 412 the configuration instructions from first memory device 116 by way of computing device 114.

The configuration instructions may be stored in a variety of data structures, such as arrays, files, tables, databases, and other data structures. As discussed above, configuration instructions may be stored in multiple configuration files where each configuration file is associated with a different configuration. Alternatively, one configuration file, such as configuration file 504, can include the configuration instructions associated with multiple configurations. In other words, configuration instructions associated with multiple configurations also can be stored in one configuration file 504. Identifiers or separators may be included in the configuration file to identify or associate one or more configuration instructions with a particular configuration. As a result, to retrieve the configuration instructions associated with a selected configuration, program application launch module 120 searches for configuration instructions within configuration file 504 that are associated with the selected configuration and retrieves the configuration instructions from the configuration file.

The following Table A is an example of a configuration file that stores configuration instructions in Extensible Markup Language (XML) associated with one configuration.

TABLE A

<choiceMenu>
1 - "Connect to SanDisk"
2 - "Play Song A"
</choiceMenu>
<action>
1 - Connect_flag: <url> www.sandisk.com </url>
2 - Play_flag: <d>:\songa.mp3
</action>

In Table A, the elements "Connect_flag: <url> www.sandisk.com </url>" and "Play_flag: <d>:\songa.mp3" are configuration instructions. The elements "Connect to SanDisk" and "Play Song A" are configuration instruction identifiers. The configuration instruction identifiers identify the configuration instructions and, as will be explained in more detail below, the configuration instruction identifiers may be displayed or presented to a user by the computing device. Configuration instruction identifiers may include, for example, texts and graphical user interface (GUI) items (e.g., icons, animated icons, and other GUI items). Each configuration instruction may have a corresponding configuration instruction identifier. For example, in Table A, the configuration instruction identifier "Connect to SanDisk" is associated with the configuration instruction "Connect_flag: <url> www.sandisk.com </url>." Similarly, the configuration instruction identifier "Play Song A" is associated with the configuration instruction "Play_flag: <d>:\songa.mp3." It should be noted that a computing device can also assign its own identifier to represent a configuration instruction identifier. For example, the computing device can map a particular text to a configuration instruction identifier. As a result, for instance, the computing device can display the same set of configuration instruction identifiers in different languages.

It should be noted that in addition to XML, the configuration instructions stored in a configuration file can be in a variety of different formats. The following Table B is another example of a configuration file that stores configuration instructions associated with one configuration.

TABLE B

Flag: [TAB] Parameter 1 [TAB] optional menu item [TAB] optional path to picture and logo
Connect_flag: [TAB] www.sandisk.com [TAB] connect to SanDisk [TAB] SanDisklogo Play_flag: [TAB] mysong.mp3

As shown in Figure B, instead of XML, the configuration instructions and configuration instruction identifiers are in a data format in which each piece of data is separated by a tab. Alternatively, the configuration instructions and configuration instructions identifiers can be separated by a comma or other characters.

In an embodiment, program application launch module 120 can transmit all the configuration instructions retrieved from first memory device 116 that are associated with a selected configuration to associated program application 104. In another embodiment, program application launch module 120 can transmit selected configuration instructions that are associated with a configuration to program application 104. Here, after program application launch module 120 retrieves the configuration instructions from first memory device 116, the program application launch module may be further configured to receive a selection of one or more configuration instructions. The selection may be made manually by a user or made automatically by program application launch module 120 or another program application.

Figure 6A:
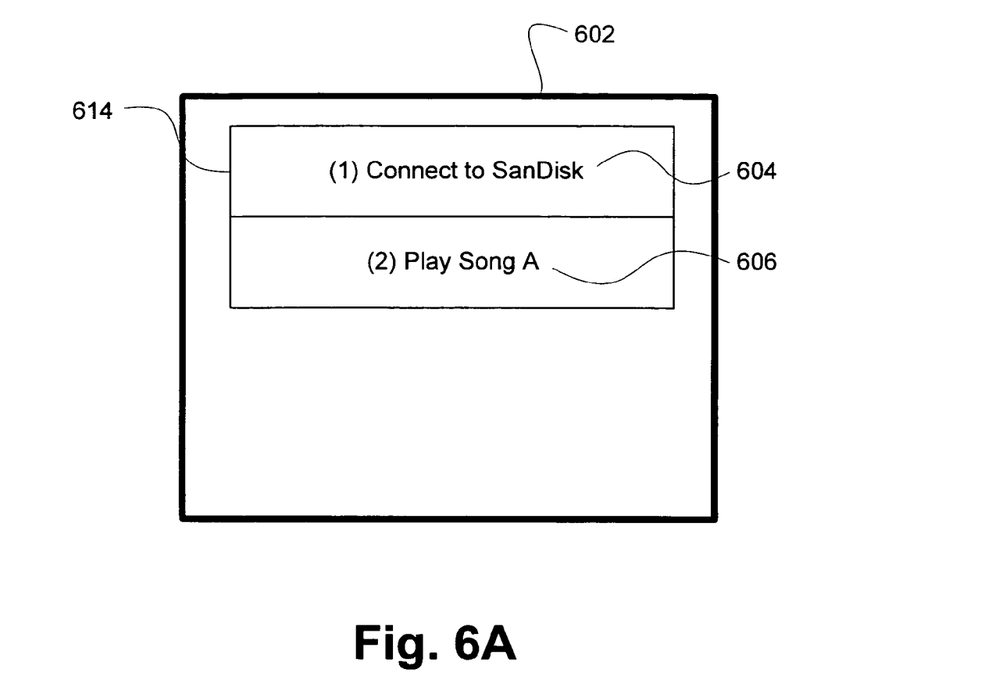
FIGS. 6A and 6B are diagrams of graphical user interfaces configured to display one or more configuration instructions for selection, in accordance embodiments of the present invention.
Figure 6B:
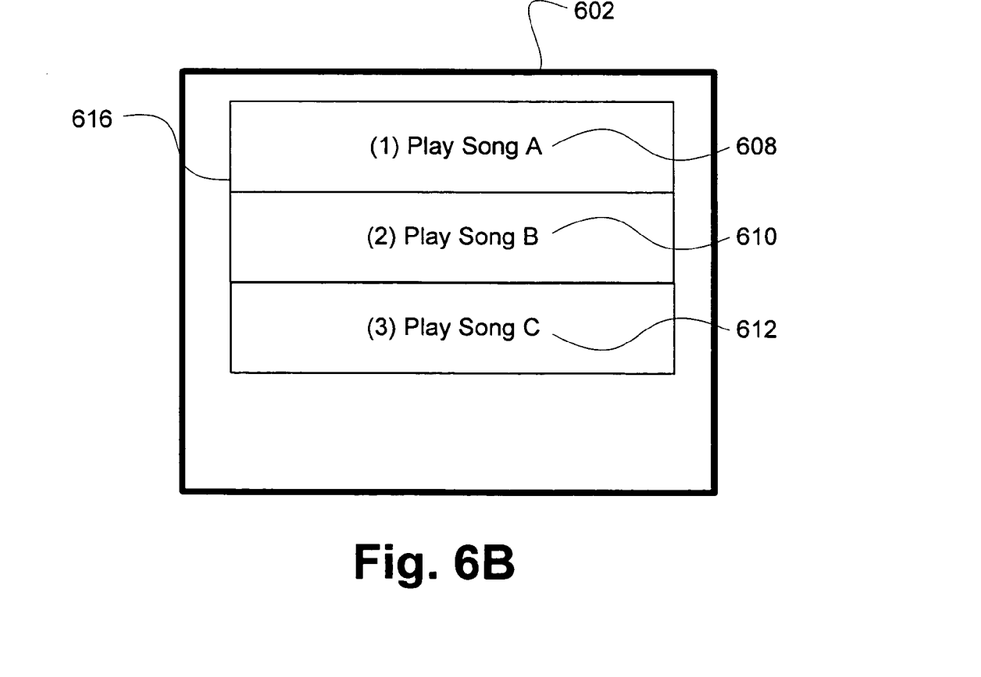

In an embodiment, a user may manually select the configuration instructions by way of a graphical user interface (GUI). Here, the configuration instructions that are retrieved can be displayed in a GUI on a computing device. The GUI is configured to display or provide the configuration instructions for selection. FIGS. 6A and 6B are diagrams of graphical user interfaces configured to display one or more configuration instructions for selection, in accordance embodiments of the present invention. As shown in FIGS. 6A and 6B, GUIs 614 and 616 are a set of menus displayed to a user on display 602 of a computing device. In FIG. 6A, GUI 614 is a menu associated with a particular configuration. In general, a menu is a list of commands presented to a user. In addition to configuration instructions, a program application launch module can also retrieve configuration instruction identifiers 604 and 606, such as the configuration instruction identifiers shown in Table A, from a memory device. GUI 614 may be configured to display configuration instruction identifiers 604 and 606 for selection. For example, with reference to Table A above, configuration instruction identifiers "Connect to SanDisk" and "Play Song A" can be retrieved along with their associated configuration instructions and, as shown in FIG. 6A, the configuration instruction identifiers 604 and 606 can be displayed in GUI 614. A user may select one or more configuration instruction identifiers 604 and 606 displayed in GUI 614. Since configuration instructions are associated with configuration instruction identifiers 604 and 606, a selection of a configuration instruction identifier corresponds to a selection of its associated configuration instruction. Configuration instruction identifiers 604 and 606 displayed in GUI 614 may be selected by a variety of techniques, such as positioning a cursor over a GUI region and clicking a mouse, depressing a key on a keyboard, and other selection techniques.

It should be appreciated that the choice of configuration instructions provided or displayed for selection depends on the type of configuration selected. The configuration instructions associated with one configuration may be different from the configuration instructions associated with another configuration. For example, FIG. 6B shows GUI 616 that is associated with a configuration that is different from the configuration of FIG. 6A. The configuration instructions associated with the configuration of FIG. 6B is therefore different from the configuration instructions associated with the configuration of FIG. 6A. As a result, GUI 616 of FIG. 6B displays a set of configuration instruction identifiers 608, 610, and 612 for selection that is different from the set of configuration instruction identifiers shown in FIG. 6A.

In addition to the menus shown in FIGS. 6A and 6B, the configuration instruction identifiers may be provided in a variety of other GUIs, such as buttons, menus, scroll bars, and other GUIs. A variety of suitable layouts can be designed for region layouts illustrated above as FIGS. 6A and 6B do not represent all possible layout options available. The displayable appearance of the regions (e.g., menu regions) can be defined by a variety suitable geometric shapes (e.g., rectangle, square, circle, triangle, and other shapes), alphanumeric characters (e.g., A, v, t, Q, 1, 9, 10, and other characters), symbols (e.g., $, *, ▼, ¤, ♥, and other symbols), shadings, patterns (e.g., solid, hatch, stripes, dots, and other patterns), and colors. It should also be noted that the regions can be fixed or customizable. Additionally, the computing device displaying the GUIs may have a fixed set of layouts, utilizes a defined protocol or language to define a layout, or an external structure can be reported to the computing device that defines a layout.

Returning to FIG. 5, after a selection of one or more configuration instructions is received, program application launch module 120 associates one or more program applications, such as program application 104, with each of the selected configuration instructions. Program application launch module 120 can be configured to recognize and associate each of the selected configuration instructions with a corresponding program application. Thereafter, program application launch module 120 launches program application 104 that is associated with the selected configuration instruction. After program application 104 is launched, program application launch module 120 then transmits the selected configuration instruction to the program application.

Figure 7:
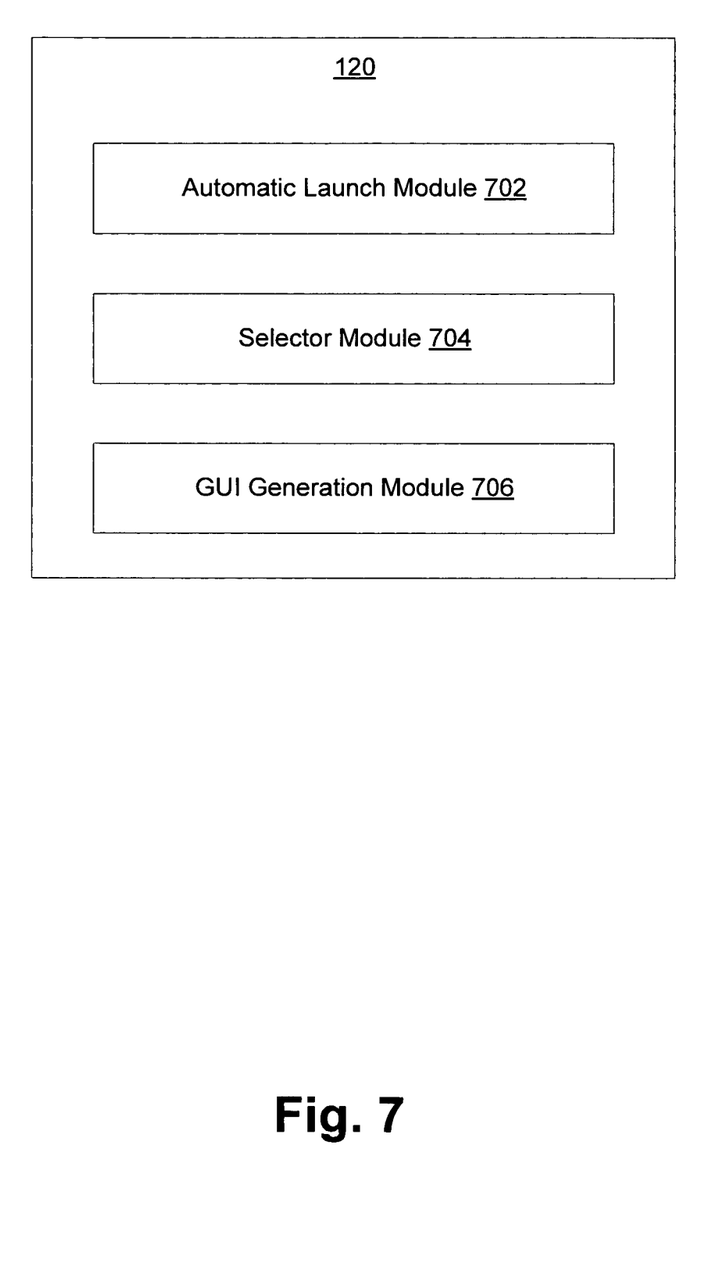
FIG. 7 is a simplified block diagram of the modules that may be included in a program application launch module, in accordance with an embodiment of the present invention.

FIG. 7 is a simplified block diagram of the modules that may be included in a program application launch module, in accordance with an embodiment of the present invention. As shown in FIG. 7, program application launch module 120 includes automatic launch module 702, selector module 704, and GUI generation module 706. Selector module 704 is configured to select a configuration and retrieve the configuration instructions that are associated with the selected configuration. Selector module 704 also may be further configured to receive a selection of one or more configuration instructions that are associated with the selected configuration. In an embodiment, the selection can be provided by GUI generation module 706. GUI generation module 706 is configured to generate and display a GUI, such as a menu. The GUI is configured to display the retrieved configuration instructions for selection. As a result, a user may select one or more configuration instructions using a GUI generated by GUI generation module 706 and, in turn, the GUI generation module transmits the selection to selector module 704. With the selection of configuration instructions received, selector module 704 calls automatic launch module 702 to launch a program application that is associated with the selected configuration instruction. Automatic launch module 702 can launch the program application or call another program application, such as an operating system, to launch the program application.

It should be appreciated that in other embodiments, program application launch module 120 may include fewer or more modules apart from those shown in FIG. 7. For example, in another embodiment, program application launch module 120 does not include GUI generation module 706 as the generation of the GUI may be transferred to an operating system.

Figure 8:
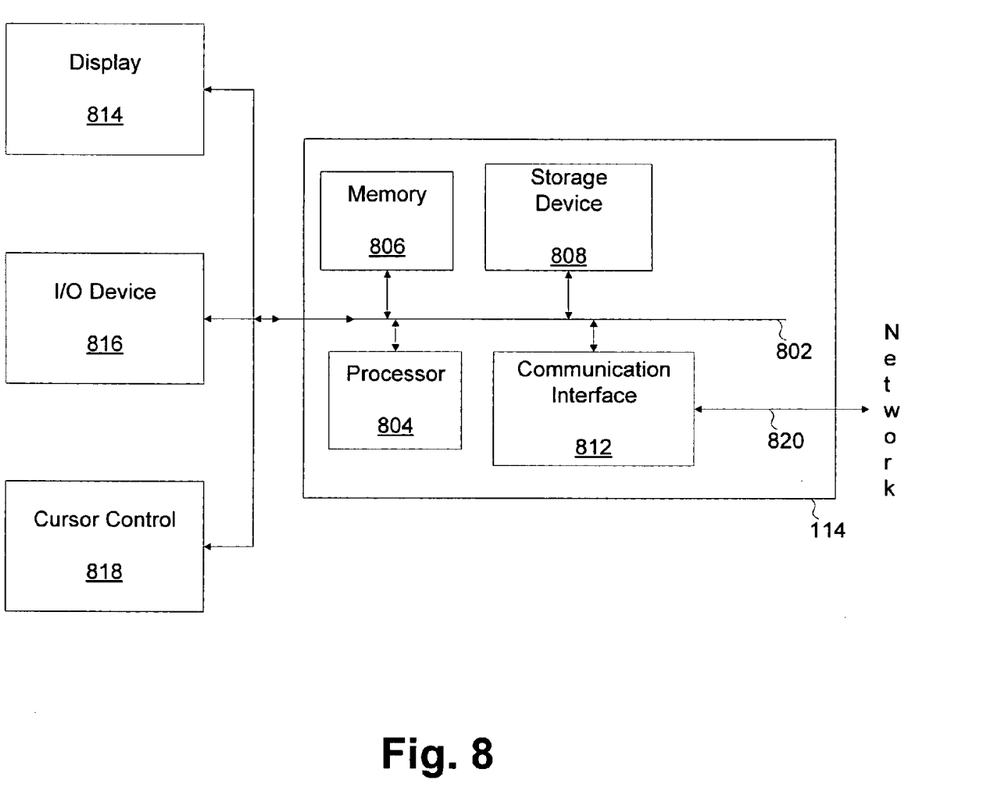
FIG. 8 is a simplified block diagram of a general overview of a computing device suitable for hosting the program application launch module and other program applications, in accordance with an embodiment of the present invention.

FIG. 8 is a simplified block diagram of a general overview of a computing device suitable for hosting the program application launch module and other program applications, in accordance with an embodiment of the invention. In some embodiments, computing device 114 may be used to implement computer programs (e.g., program application launch module), logic, applications, methods, processes, or other software to access configuration instructions stored in memory devices. Examples of computing device 114 include a desktop computer, a server, a portable computing device, a personal digital assistant, a mobile phone, a computational engine within an appliance, and other computer systems. As shown in FIG. 8, host computing device 114 includes bus 802 or other communication mechanism for communicating information, which interconnects subsystems and devices, such as processor 804, system memory 806 (e.g., random access memory (RAM)), storage device 808 (e.g., read only memory (ROM), magnetic disk drives, optical disk drives, and other storage devices), communication interface 812 (e.g., modem or Ethernet card), display 814 (e.g., cathode ray tube (CRT) or liquid crystal display (LCD)), input/output device 816 (e.g., keyboard), and cursor control 818 (e.g., mouse or trackball).

In some embodiments, host computing device 114 performs specific operations by processor 804 when executing one or more sequences of one or more program instructions stored in system memory 806. Such program instructions may be read into system memory 806 from another computer readable medium, such as storage device 808. In some embodiments, hard-wired circuitry may be used in place of or in combination with software program instructions to implement embodiments of the invention.

It should be appreciated that the term "computer readable medium" refers to suitable medium that participates in providing program instructions to processor 804 for execution. Such a medium may take many forms, including but not limited to, non-volatile media, volatile media, and transmission media. Non-volatile media may include, for example, optical or magnetic disks, such as storage device 808. Volatile media may include dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 114. In other embodiments, two or more computer systems, such as computing device 114, coupled by communication link 820 (e.g., local area network (LAN), public switched telephone network (PSTN), wireless network, and other communication links) may perform the sequence of program instructions to practice the embodiments in coordination with one another. In addition, computing device 114 may transmit and receive messages, data, and instructions, including program, i.e., application code, through communication link 820 and communication interface 812. Received program instructions may be executed by processor 804 as the program instructions are received, and/or stored in storage device 808, or other non-volatile storage for later execution.

Figure 9:
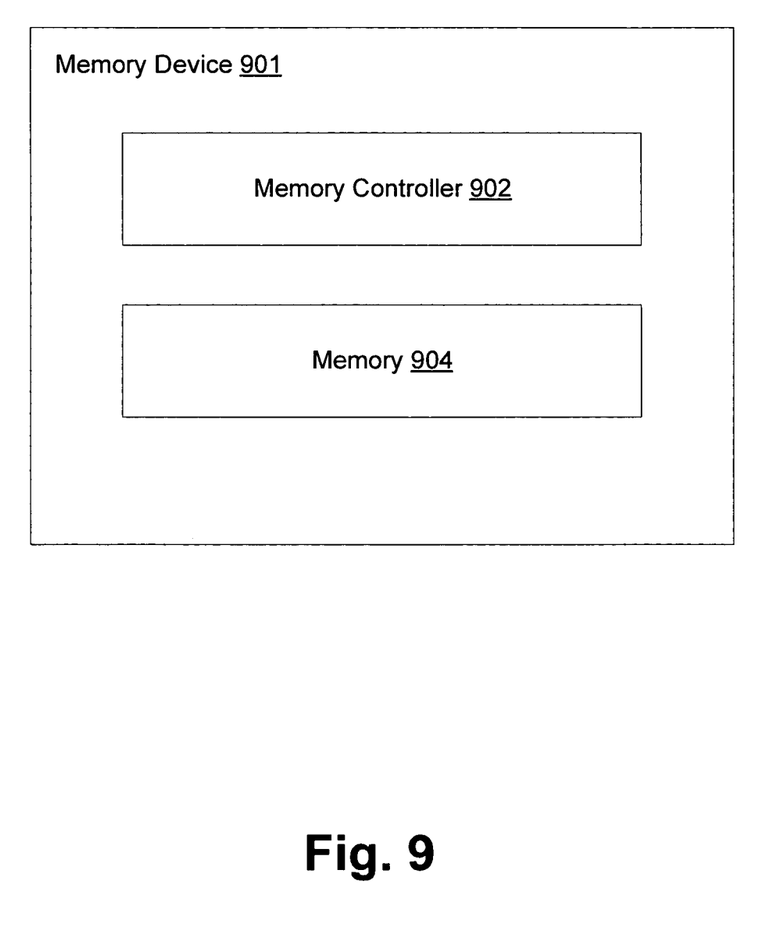
FIG. 9 is a simplified block diagram of a memory device, in accordance with an embodiment of the present invention.

FIG. 9 is a simplified block diagram of a memory device, in accordance with an embodiment of the invention. As shown in FIG. 9, memory device 901 includes memory controller 902 in communication with memory 904. In general, memory controller 902 controls the operation of memory 904. Examples of operations include writing (or programming) data, reading data, erasing data, verifying data, and other operations. Additionally, memory controller 902 may be configured to generate selecting a configuration from multiple configurations, to retrieve configuration instructions, to associate each configuration instruction with a program application, and configured for other operations described above.

Memory device 901 can include a variety of non-volatile memory structures and technologies. Examples of memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contactless transistor (ACT), and other flash memories), erasable programmable read-only memory (EPROM), electrically-erasable programmable read-only memory (EEPROM), read-only memory (ROM), one-time programmable memory (OTP), and other memory technologies. In an embodiment, memory device 901 may be a smart card using EEPROM, ROM, or other memory technologies. Examples of smart cards include a contactless smart card, a Subscriber Identity Module (SIM) card, and other smart cards. In another embodiment, memory device 901 can be a flash memory card using flash memory. Examples of flash memory cards include a variety of the following trademarked products such as SD Card™ (compliant with specifications maintained by the SD Card Association of San Ramon, Calif.), MultiMediaCard™ (compliant with specifications maintained by the MultiMediaCard Association ("MMCA") of Palo Alto, Calif.), MiniSD™ (compliant with specifications maintained by the SD Card Association of San Ramon, Calif.), MicroSD™ (compliant with specifications maintained by the SD Card Association of San Ramon, Calif.), CompactFlash™ (compliant with specifications maintained by the CompactFlash Association ("CFA") of Palo Alto, Calif.), SmartMedia™ (compliant with specifications maintained by the Solid State Floppy Disk Card ("SSFDC") Forum of Yokohama, Japan), xD-Picture Card™ (compliant with specifications maintained by the xD-Picture Card Licensing Office of Tokyo, Japan), Memory Stick™ (compliant with specifications maintained by the Memory Stick Developers Office), TransFlash™ (as manufactured by SanDisk, Inc.), and other flash memory cards. In an embodiment, memory device 901 can be implemented as a non-removable memory device.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method for launching a program application, comprising:
    performing with a computing device:
        selecting a configuration from a plurality of configurations associated with a plurality of configuration instructions stored in a memory device when the memory device is coupled to the computing device;
        retrieving a configuration instruction associated with the configuration from the memory device;
        automatically selecting and launching one of a plurality of program applications stored in the computing device based on the retrieved configuration instruction; and
        transmitting the retrieved configuration instruction to the program application, wherein the configuration instruction is a parameter or command associated with the program application.

2. The method of claim 1, wherein the configuration is selected based on information associated with the computing device.

3. The method of claim 1, wherein the information is a type of operating system hosted on the computing device.

4. The method of claim 1, wherein the configuration instruction is stored in a configuration file, the configuration file being associated with the configuration.

5. The method of claim 1, wherein the program application is launched after the memory device is coupled to the computing device.

6. A method for launching a program application, comprising:
    performing with a computing device:
        receiving a message indicating that a memory device is removably coupled to the computing device;
        selecting a configuration from a plurality of configurations associated with a plurality of configuration instructions stored in the memory device;
        retrieving one or more configuration instructions that are associated with the selected configuration from the plurality of configuration instructions;
        receiving a selection of a configuration instruction from the one or more configuration instructions that are associated with the configuration;
        automatically selecting and launching one of a plurality of program applications stored in the computing device based on the selected configuration instruction; and
        transmitting the selected configuration instruction to the program application, wherein the configuration instruction is a parameter or command associated with the program application.

7. The method of claim 6, wherein the configuration instruction is selected from a menu, the menu being configured to display the one or more configuration instructions that are associated with the configuration for selection.

8. The method of claim 6, wherein the configuration is selected based on information associated with the computing device.

9. The method of claim 6, wherein the one or more configuration instructions that are associated with the configuration are stored in a configuration file, the configuration file being associated with the configuration.

10. The method of claim 6, wherein the configuration instruction is configured to enable the program application to display text.

11. A method for launching a program application, comprising:
performing with a computing device:
receiving a message indicating that a memory device is coupled to the computing device;
retrieving information from the computing device;
selecting a configuration from a plurality of configurations associated with a plurality of configuration instructions stored in the memory device based on the information;
retrieving one or more configuration instructions that are associated with the configuration from the memory device;
receiving a selection of a configuration instruction from the one or more configuration instructions;
automatically selecting and launching one of a plurality of program applications based on the selected configuration instruction; and
transmitting the selected configuration instruction to the program application, wherein the configuration instruction is a parameter or command associated with the program application.

12. The method of claim 11, wherein the configuration instruction is selected from a menu, the menu being configured to display the one or more configuration instructions that are associated with the configuration for selection.

13. The method of claim 11, wherein the plurality of configuration instructions are stored in a plurality of configuration files, each of the plurality of configuration files being associated with a different configuration.

14. The method of claim 11, wherein the program application is launched after the first memory device is coupled to the computing device.

15. The method of claim 11, wherein the message is transmitted from an operating system hosted on the computing device.

* * * * *